Jan. 16, 1934.                C. C. FARMER                1,943,592
                               AIR STRAINER
                            Filed Nov. 24, 1931
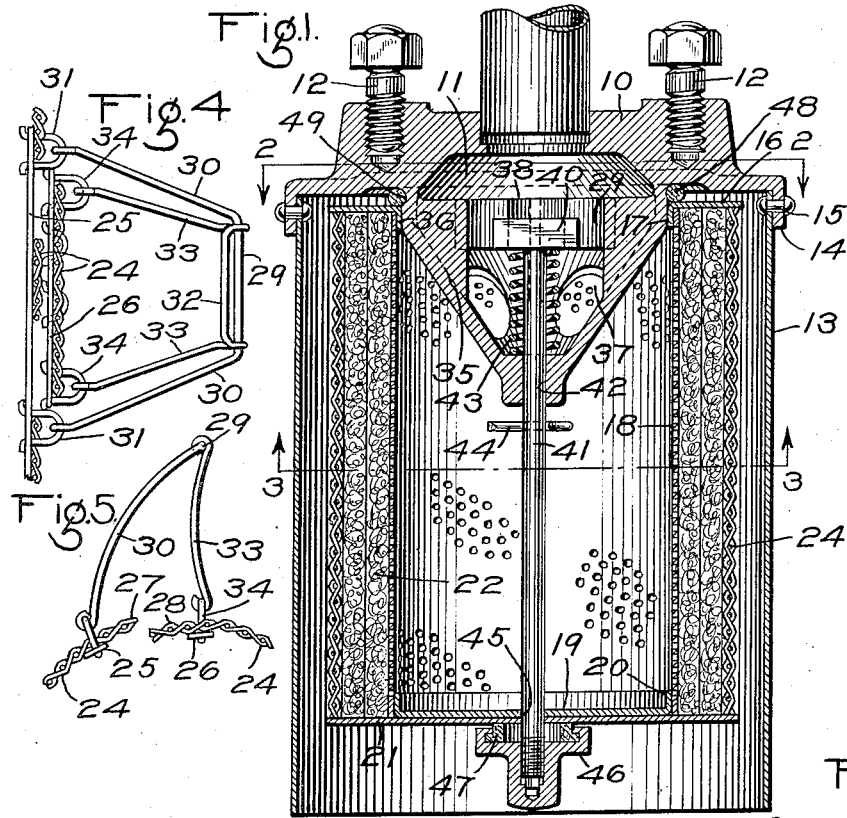
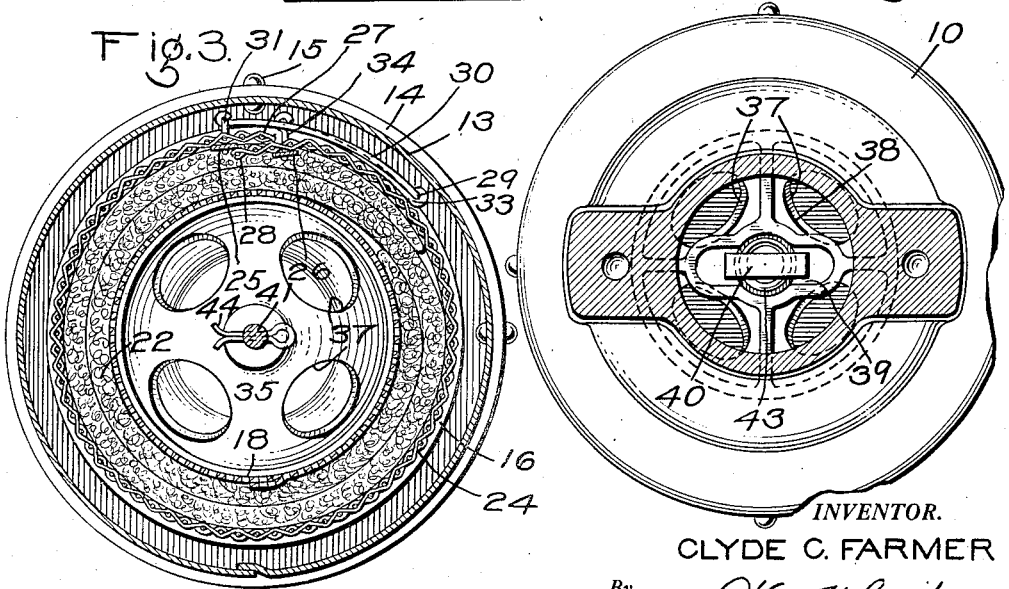
INVENTOR.
CLYDE C. FARMER
By  *Will. M. Cady*
ATTORNEY.

Patented Jan. 16, 1934

1,943,592

UNITED STATES PATENT OFFICE 1,943,592

AIR STRAINER

Clyde C. Farmer, Pittsburgh, Pa., assignor to The Westinghouse Air Brake Company, Wilmerding, Pa., a corporation of Pennsylvania Application November 24, 1931
Serial No. 576,995

8 Claims. (Cl. 183—49)

This invention relates to air strainers and more particularly to the type of strainer adapted for use in conjunction with internal combustion engines and fluid compressors.

Fluid strainers of the type to be hereinafter more specifically described are subjected to operation under widely varying conditions. The continued successful operation of the engine or compressor to which the strainer is applied is frequently dependent upon the condition and efficiency of the strainer and therefore improved means have been provided in the present device to insure long periods of efficient operation by providing a strainer constructed in a manner which will facilitate the removal, inspection, cleansing, renewal and replacement of the strainer element without necessitating the dismantling or removal of the device from its normal position on the engine or compressor.

The primary object of the present invention is the provision of an improved air strainer in which the straining element may readily be applied or removed to facilitate its inspection, cleansing or replacement.

Another object of the present invention resides in the inclusion in an air strainer of improved means for releasably retaining the straining material on a removable straining element.

A further object of the invention lies in the provision of improved means for yieldably retaining the removable straining element within the device, to insure against its impaired utility which might otherwise result from the pressure applied to the straining element in anchoring it within the casing.

Other objects and advantages will appear from the following description of an illustrative embodiment of the present invention.

In the drawing; Fig. 1 is a vertical mid-sectional view of an air strainer constructed in accordance with the teachings of the present invention; Fig. 2 is a horizontal sectional view taken on the line 2—2 of Fig. 1; Fig. 3 is a horizontal sectional view taken on the line 3—3 of Fig. 1; Fig. 4 is a view of a portion of the retaining screen, showing the clamping means in plan; and Fig. 5 is a side elevational view of the portion of the retaining screen shown in Fig. 4 more clearly illustrating the open position of the clamping means.

The fluid strainer chosen for illustrative purposes in the accompanying drawing, comprises a body portion 10, preferably in the form of a casting having a fluid chamber 11 formed therein. The body portion 10 is provided with suitable means for anchorage, such as a pair of studs 12. A shell or open ended cylindrical casing 13 is secured to a flange 14 on the body portion 10 in any approved manner, as by the application of rivets 15. The shell 13 serves as a protecting member to guard the strainer element against undue shocks or abuse which might otherwise impair its utility.

The spool upon which the strainer element is mounted comprises an end ring 16 having a depending flange 17 forming its central aperture, a perforated cylindrical member 18, an end cap 19 provided with an upstanding peripheral flange 20, and an end plate 21. These elements are secured together, by any suitable method such as welding, to form a unitary structure. The plate 21 which is substantially equal in diameter to the end ring 16 serves a dual purpose; firstly, it reenforces the bottom closure of the spool and secondly, it cooperates with the cylindrical member 18 and ring 16 to form a channel adapted to receive a suitable straining material 22. This material is preferably formed of a pulled curled hair fashioned in a sheet and cut to the desired length and width so as to be readily adapted to be wrapped around the perforated cylindrical core 18 of the spool.

The retaining element, which serves to hold the straining material 22 in position upon the spool, comprises a sheet of woven wire fabric 24 cut to a width that will permit its being received in the channel formed between the ring 16 and the end plate 21 and of such length as to encompass the straining material 22 which has been wrapped about the spool. Reenforcing strips 25 and 26 are secured, respectively, adjacent ends 27 and 28 of the woven wire fabric 24. A clamping element 29, preferably formed of bent wire of heavy gauge, is provided with a pair of legs 30 which are pivotally mounted on the strip 25 by means of staples 31. A similar clamping element 32 is hingedly mounted on the member 29 and is provided with legs 33 which are slightly shorter than the legs 30 of the element 29. The legs 30 are pivotally mounted upon the strip 26 by means of staples 34.

After wrapping the straining material around the perforated core of the spool, which operation is done prior to the positioning of spool within the device, the clamping members 29 and 32 may be opened, as shown in Fig. 5, and the wire fabric 24 passed over the end of the spool and positioned within the confines of the channel. When the retaining element has been properly positioned, the clamping member 29 may be rocked in a clockwise direction (referring to Fig. 5) to draw the woven wire fabric securely about the straining material to releasably retain it in position upon the spool. When the clamping element 32 has thus been rocked into contact with the retaining element 24 (see Fig. 3), it will readily be seen that toggle action of the clamping element will tend to hold the element tightly against the retaining means and resist accidental displacement, which would result in relieving the clamping pressure utilized to retain the straining material 22 on the spool.

The body portion 10 of the device is provided with a boss 35 having a turned portion 36 adapted to slidably receive the ring portion 16 of the spool to properly position the spool within the casing 13. The boss 35 is provided with a plurality of apertures 37 through which fluid may be drawn from the hollow core 18 of the strainer to the chamber 11 formed in the body portion 10. A spider 38 formed in the chamber 11 is provided with a slot 39 adapted to receive a head 40 formed on tie rod 41 which passes through a bore 42 in the boss 35. The slot 39 is so shaped as to prevent the rotation of the head 40. A coil spring 43, which surrounds the rod 41, is confined between the head 40 of the rod and the bottom of chamber 11. This spring normally tends to urge the rod upwardly and its movement in this direction is limited by a cotter pin 44 positioned on the rod 41 beneath the boss 35. The tie rod 41, which serves as an anchoring means for retaining the strainer spool, extends through an aperture 45 formed in the end cap 19 and end plate 21. The lower extremity of the rod is threaded to receive a cap nut 46 provided with a resilient washer 47 adapted to engage the bottom of the end plate 21 to seal the aperture 45 and urge the spool upwardly against a resilient ring 48 positioned in a groove 49 at the upper end of the turned portion 36 of the boss 35. The ring 48 serves to seal central aperture of the ring 16 to prevent air from being drawn into the chamber 11 without passing through the straining material 22.

The coil spring 43, surrounding the tie rod 41 and normally tending to urge it upwardly, serves a dual purpose. The primary reason for its inclusion is to provide adequate means for yieldably retaining the strainer spool in position without danger of its being damaged, or rendered less effective, by the pressure resulting from the application of the retaining nut 46 to the tie rod 41. A further purpose of the spring 43 is to provide a yieldable means for maintaining sealing contact between the washer 47 and the bottom plate 21 of the spool and between the ring 16 of the spool and the resilient ring 48 so as to preclude the admission of unstrained fluid to the chamber 11.

From the foregoing description, it will readily be seen that an improved fluid strainer has been provided in which the strainer spool may readily be withdrawn from the device upon the removal of the retaining nut 46. After the spool has been removed, the straining material may readily be inspected, cleansed, or replaced, as necessity may require, by merely swinging the element 29 away from the retaining screen 24 to free its clamping pressure, and sliding it over the end of the spool, at which time the straining material is made accessible. Upon completion of the desired operation, the straining material may be wrapped about the pervious core 18, the wire mesh retaining means repositioned and clamped upon the spool, and the spool replaced in the casing and releasably retained there by the application of the nut 46 to the tie rod 41. As previously set forth, the coil spring 43 serves to prevent the end of the spool from buckling or being distorted by yieldably resisting the pressure applied by the application of the retaining nut 47.

While the invention has been described in considerable detail in the foregoing specification, it will be understood that various changes may be made in its embodiment without departing from or sacrificing any of the advantages hereinafter claimed.

Having now described my invention, what I claim as new and desire to secure by Letters Patent, is:

1. A fluid strainer comprising a casing, a strainer element adapted to be releasably secured in said casing, said strainer element comprising a perforated core, a sheet of pervious straining material adapted to be wrapped about said core, means for releasably retaining said material on said core, said means comprising a perforated flexible element adapted to surround said straining material, clamping means on said perforated flexible element operable to releasably retain said material on said core, and means for yieldably retaining said strainer element in said casing.

2. A fluid strainer element comprising a cylindrical member, straining material surrounding said member, a flexible sheet enclosing said material, and means for clamping said sheet around said material comprising an element having a hinge connection with one longitudinal edge of the sheet, and an element having a hinge connection with the other longitudinal edge of the sheet, said elements being pivotally connected together and rotatable to clamp the sheet into engagement with said material.

3. A fluid strainer element comprising a cylindrical member, straining material surrounding said member, a flexible sheet enclosing said material, and means for clamping said sheet around said material comprising an element having a hinge connection with one longitudinal edge of the sheet, and an element of greater length than the first element and having a hinge connection with the other longitudinal edge of the sheet, said elements being pivotally connected and being rotatable to clamp the sheet into engagement with said material.

4. A fluid strainer comprising a cylindrical straining element through the walls of which fluid flows, an end member for closing one end of said cylindrical element, a body member for closing the other end of said element and having a conduit communicating with the interior of said element, the said body member being provided with a yoke past which fluid may flow to or from said conduit, and disposed interiorly of said cylindrical element for receiving a tie bolt, a tie bolt having sliding connection with said yoke and said end member, spring means cooperating with said yoke and said tie bolt for normally yieldingly drawing said bolt inwardly, and means on the outer end of said bolt and engaging said end member for forcing said straining element into engagement with said body member.

5. A fluid strainer comprising a cylindrical straining element through the walls of which fluid flows, an end member for closing one end of said cylindrical element, a body member for closing the other end of said element and having a conduit communicating with the interior of said element, the said body member being provided with a yoke past which fluid may flow to or from said conduit, and disposed interiorly of said cylindrical element for receiving a tie bolt, a tie bolt having sliding non-rotative connection with said yoke and sliding connection with said end member, a spring means cooperating with said yoke and said tie bolt for normally yieldingly drawing said bolt inwardly, and a nut threaded on the outer end of the bolt and engaging said end member for forcing said straining element into engagement with said body member.

6. A fluid strainer comprising a cylindrical straining element through the walls of which fluid flows, an end member for closing one end of said cylindrical element, a body member for closing the other end of said element and having a conduit communicating with the interior of said element, the said body member being provided with a yoke past which fluid may flow to or from said conduit, and disposed interiorly of said cylindrical element for receiving a tie bolt and for centering said straining element upon said body member, a tie bolt having sliding connection with said yoke and said end member, spring means cooperating with said yoke and said tie bolt for normally yieldingly drawing said bolt inwardly, and means on the outer end of said bolt and engaging said end member for forcing said straining element into engagement with said body member.

7. A fluid strainer comprising a cylindrical straining element through the walls of which fluid flows, an end member for closing one end of said cylindrical element, a body member for closing the other end of said element and having a conduit communicating with the interior of said element, the said body member being provided with a yoke past which fluid may flow to or from said conduit, and disposed interiorly of said cylindrical element for receiving a tie bolt, a tie bolt having sliding connection with said yoke and said end member, spring means cooperating with said yoke and said tie bolt for normally yieldingly drawing said bolt inwardly, means on said bolt for engaging said yoke for limiting the inward movement of said bolt with respect to said yoke and adjustable removable means on the outer end of said bolt and engaging said end member for forcing said straining element into engagement with said body member.

8. A fluid strainer comprising a cylindrical straining element through the walls of which fluid flows, an end member for closing one end of said cylindrical element, a body member for closing the other end of said element and having a conduit communicating with the interior of said element, the said body member being provided with a yoke past which fluid may flow to or from said conduit, and disposed interiorly of said cylindrical element for receiving a tie bolt, a tie bolt having sliding connection with said yoke and said end member, spring means cooperating with said yoke and said tie bolt for normally yieldingly drawing said bolt inwardly, means on the outer end of said bolt engaging said end member for forcing said straining element into engagement with said body member, and a cylindrical casing surrounding said straining element and in spaced relation thereto and having one end closed by said body member and its other end open.

CLYDE C. FARMER.